US011093287B2

(12) United States Patent
Guim Bernat et al.

(10) Patent No.: US 11,093,287 B2
(45) Date of Patent: Aug. 17, 2021

(54) DATA MANAGEMENT FOR EDGE ARCHITECTURES

(71) Applicant: Intel Corporation, Santa Clara, CA (US)

(72) Inventors: Francesc Guim Bernat, Barcelona (ES); Ramanathan Sethuraman, Bangalore (IN); Karthik Kumar, Chandler, AZ (US); Mark A. Schmisseur, Phoenix, AZ (US); Brinda Ganesh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 153 days.

(21) Appl. No.: 16/422,905

(22) Filed: May 24, 2019

(65) Prior Publication Data

US 2019/0278631 A1    Sep. 12, 2019

(51) Int. Cl.
*G06F 9/50*    (2006.01)
*G06F 9/54*    (2006.01)

(52) U.S. Cl.
CPC ............ *G06F 9/5011* (2013.01); *G06F 9/542* (2013.01)

(58) Field of Classification Search
CPC .................................................. G06F 9/5011
See application file for complete search history.

(56) References Cited

U.S. PATENT DOCUMENTS

| 2014/0281266 A1* | 9/2014 | Johnson | G06F 12/0815 711/141 |
| 2016/0147656 A1* | 5/2016 | Hower | G06F 12/128 711/130 |
| 2019/0042437 A1 | 2/2019 | Bernat et al. | |
| 2019/0042783 A1 | 2/2019 | Bernat et al. | |
| 2019/0044886 A1 | 2/2019 | Bernat et al. | |

OTHER PUBLICATIONS

The Evolution of Edge Computing, ABI Research, Published Jan. 29, 2018, 6 pages, https://www.intel.com/content/www/us/en/communications/evolution-of-edge-computing-paper.html.
White Paper: Architecture Specification White Paper Internet of Things (IOT), Copyright 2015, https://www.intel.com/content/www/us/en/internet-of-things/white-papers/iot-platform-reference-architecture-paper.html, 11 pages.

* cited by examiner

*Primary Examiner* — Charlie Sun
(74) *Attorney, Agent, or Firm* — Compass IP Law PC (57) ABSTRACT

Data management for edge architected computing systems extends current storage and memory schemes of edge resources to expose interfaces to allow a device, such as an endpoint or client device, or another edge resource, to specify criteria for managing data originating from the device and stored in an edge resource, and extends the storage and memory controllers to manage data in accordance with the criteria, including removing stored data that no longer satisfies the criteria. The criteria includes a temporal hint to specify a time after which the data can be removed, a physical hint to specify a list of edge resources outside of which the data can be removed, an event-based hint to specify an event after which the data can be removed, and a quality of service condition to modify the time specified in the temporal hint based on a condition, such as memory and storage capacity of the edge resource in which the data is managed.

22 Claims, 10 Drawing Sheets

| Tenant ID | Memory/Storage Range | Temporal Hints TTL | Physical Hints {List of Edges} | Event-based Hints Event | QoS/SLA Events |
|---|---|---|---|---|---|
| UUID | [A,B] | | | | |
| 0x032 | [0x22,0x77] | 30s | {CT1,...CTn} | N/A | 1s if Free Memory < 400 |
| 0x34 | [0x90,0x100] | N/A | N/A | OnImageAnalyzed | ... |
| ... | ... | ... | ... | ... | ... |
| 406 | 408 | 410 | 412 | 414 | 416 |

Criteria (e.g., Hints and Events) Table 116

DATA MANAGEMENT FOR EDGE ARCHITECTURES

TECHNICAL FIELD

The descriptions are generally related to data management, and more particularly to managing data in computer systems in edge computing architectures.

BACKGROUND

The volume of data consumed and produced by devices is increasing at a very fast rate, from endpoint devices and/or client devices such as smart phones to Internet of Things (IoT) industrial equipment to autonomous cars. Edge computing architectures have emerged to process these large volumes of data closer to the endpoint/client devices rather than at a data center core as in a traditional data center environment or in a remote cloud environment. Using edge computing architectures, data centers and network providers can deliver more powerful services, reduce latency and optimize the total cost of ownership.

Nevertheless, increased demands for services and resources at the edge of the network by applications and systems that can benefit from edge cloud architectures, such as IoT, manufacturing, aviation (including unmanned aviation), autonomous driving and numerous other use cases made possible by the widespread adoption of 5G ("fifth generation") communication networks, can jeopardize the performance of edge computing architectures.

BRIEF DESCRIPTION OF THE DRAWINGS

In the description that follows, examples may include subject matter such as a method, a process, a means for performing acts of the method or process, an apparatus, a memory device, a system, and at least one machine-readable tangible storage medium including instructions that, when performed by a machine or processor, cause the machine or processor to performs acts of the method or process according to described embodiments illustrated by way of example and not limitation in the figures of the accompanying drawings, in which like references indicate similar elements and in which.

DETAILED DESCRIPTION

Edge computing architectures can be deployed differently depending on the industry and the types of customers served. For example, edge computing architectures were initially deployed to provide data services in mobile communication networks using base stations at the edge of the network. Edge architectures are increasingly used in other industries as well. Enterprise data centers might use edge computing in regional and branch offices to provide data driven and security sensitive services to endpoint devices such as Virtual Private Networks (VPN), firewalls, routing through Software Defined Wide Area Networks (SD-WAN), and workload optimizations through Network Function Virtualization (NFVi). And cloud data centers might integrate edge computing architectures with cloud-based network architectures to enable web-tier services and content delivery to devices, such as client devices, through a network provider or Internet service hub used by consumers on their mobile and/or internet-connected devices. Network data centers might use low-latency and high-bandwidth Multi-access Edge Computing (MEC), a non-cellular edge computing technology, and Radio Access Networks (RAN) to provide edge computing power to devices, such as endpoint devices and client devices, particularly for newer 5G communication networks.

A key advantage of the edge computing paradigm is situating compute resources near a device, such as in an edge gateway device. An edge gateway device can be any device capable of communicating data between the device and one or more edge resources, including other edge gateway devices, compute devices and other components owned and/or operated by one or more service providers, such as cellular network operators, or other compute devices located in a cloud network. The edge gateway device is typically positioned at one or more locations (e.g., in small cell(s), base station(s), etc.) along the edge of the cloud, i.e., the edge network. Examples of edge resources include a mobile base station of a network data center, a branch of a regional office of an enterprise data center, or an internet service hub of a cloud service provider. Having the compute resources near the device makes it possible to respond with low-enough latency for most applications, such as IoT applications. For this reason, edge computing has emerged as a preferred means to handle ultra-low latency real-time responses to massive data volumes because conventional computing architectures, such as cloud computing, result in too much latency.

However, the challenge with edge computing is that it is resource constrained. There is a limit to the amount of memory that can be located in servers at a base station, for example. Data on the other hand, often needs to be held "in-memory" for real-time processing and low response times. Going to disk is simply not an option in several situations.

Several of the real-time applications that use edge computing, such as self-driving cars, emergency alert systems, fraud detection systems, and real-time geo-spatial advertising all have requirements for data that need to be processed and responded to as soon as possible. However, for many real-time applications, the value of the data itself fades over time. In other words, there is far less value in data that predicts a tsunami once the tsunami has passed, or in data used to target someone to enter a store once that person has moved to a different location, or in data that predicts a crash after the time or location of prediction has passed.

In addition to the time-value of data, certain privacy constraints impose a different requirement on data handling over time. For example, there is currently an increased focus on data privacy and sensitivity for healthcare, surveillance, and other types of data collected at the edge of an edge network. While there is a need to process such data at the edge, there are often requirements that data must be destroyed, archived or encrypted after processing.

The current approach to culling the large amounts of data processed at the edge of an edge network is software-based. But software-based solutions can substantially increase the total cost of ownership to service providers because compute resources must be devoted to perform the software-based data management. Compute elements that should be used to provide edge services are instead devoted to data management, thereby reducing revenue. In addition, the lack of automated and accelerated mechanisms to deal with the tremendous amount of data generated by devices will continue to swamp any software-based solutions.

To address the challenge of managing data in an edge network in an efficient manner, embodiments of data management for edge architectures expose an interface for devices and edge resources to specify criteria for managing data stored in an edge resource based on the specified criteria. As contemplated in the present disclosure, the interface extends current storage, memory and replication schemes of the edge resources of an edge architected system to allow specifying different types of criteria. In addition, the interface extends the storage and memory controllers of the edge resources in order to monitor and remove data that no longer satisfies the criteria.

Given the resource constraints (e.g., small memory capacity) of edge resources, including edge gateway devices positioned at the edge of an edge architected system, the need to hold data in memory for real-time computations and the diminishing value of that data over time, there is a need to be able to efficiently manage data held in the memory of an edge resource. Embodiments of data management for edge architectures as described herein are capable of managing data (1) quickly to accommodate data streaming at a very fast rate, (2) based on global knowledge of all the data that is held in memory, (3) based on privacy requirements on data aging/archival from memory, and (4) based on the time/space/distance value of the data itself.

Among other advantages, the described embodiments of data management for edge architectures allow automatic and accelerated data management in edge resources in a smart way using temporal, physical and event-based hints provided by the devices from which the data originated. Smart data management provides: (1) lower total cost of ownership, (2) conditional data lifetime based on quality of service (QoS), (3) improved data management, (4) event-based automatic data removal, which is critical to many edge use cases, and (5) optimization of storage resources, particularly critical for edge resources having small form factors (e.g., a base station).

Figure 1:
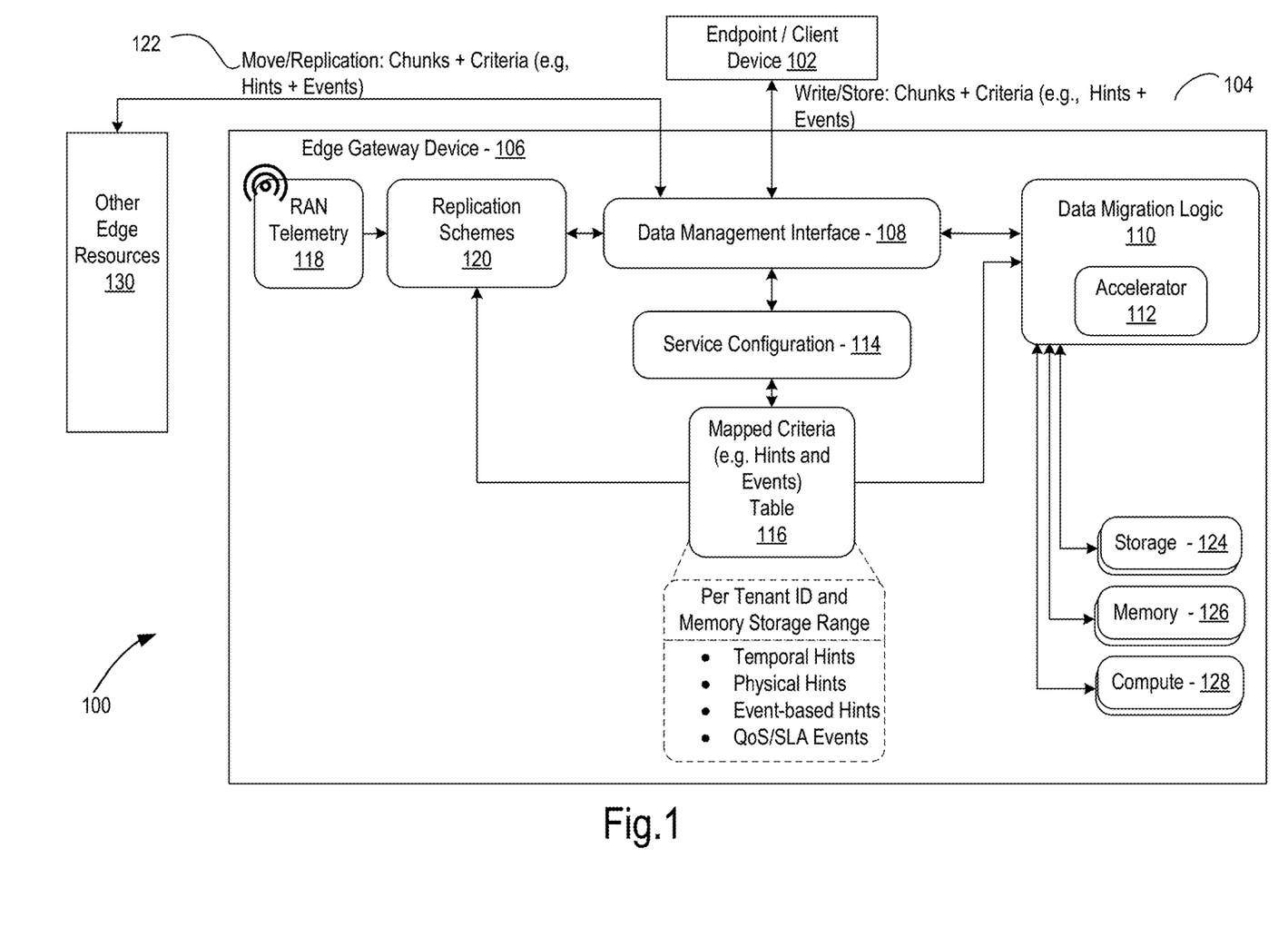
FIG. 1 is a schematic block diagram of a system for data management for edge architectures in accordance with various examples described herein.

FIG. 1 illustrates an example computing system 100 in which embodiments of data management for edge architectures provide endpoint devices, client devices or any device from which data can originate (hereafter collectively referred to simply as devices), and the edge resources to which they are connected, with more efficient mechanisms to manage how data is stored and shared.

In the illustrated example of an edge architected computing system 100 in FIG. 1, an device 102, such as a mobile telephone or other device having a sensor and computing capability, is wirelessly connected to an edge resource such as an edge gateway device 106 that can include, among other components a Radio Access Network telemetry 118, a replication scheme 120, and storage 124, memory 126 and compute 128 resources. The illustrated system 100 might be used, for example, by a communication service provider in conjunction with a network data center to provide 5G-enabled services, including massive data-generating and consuming services such as virtual/augmented reality and autonomous driving.

In one embodiment, the storage 124 and memory 126 resources may include volatile types of memory including, but not limited to, random-access memory (RAM), dynamic RAM (D-RAM), double data rate (DDR) SDRAM, SRAM, T-RAM or Z-RAM. One example of volatile memory includes DRAM, or some variant such as SDRAM. The storage 124 and memory 126 resources can include a memory subsystem that is compatible with a number of memory technologies, such as DDR4 (DDR version 4, initial specification published in September 2012 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (LPDDR version 5, currently in discussion by JEDEC), HBM2 (HBM version 2, currently in discussion by JEDEC), and/or others, and technologies based on derivatives or extensions of such specifications.

However, examples are not limited in this manner, and in some instances, any storage 124 and memory 126 resources may include non-volatile types of memory, whose state is determinate even if power is interrupted to a memory. In some examples, memory may include non-volatile types of memory that is a block addressable, such as for NAND or NOR technologies. Thus, memory can also include a future generation of types of non-volatile memory, such as a 3-dimensional cross-point memory (3D XPoint™ commercially available from Intel Corporation), or other byte addressable non-volatile types of memory. According to some examples, memory may include types of non-volatile memory that include chalcogenide glass, multi-threshold level NAND flash memory, NOR flash memory, single or multi-level Phase Change Memory (PCM), a resistive memory, nanowire memory, FeTRAM, MRAM that incorporates memristor technology, or STT-MRAM, or a combination of any of the above, or other memory.

In one embodiment, the compute resources 128 may include processors that are designed for a broad range of lower-power high-density edge computing needs, such as the Intel® Zeon® D-series of multi-core processors having up to 512 GB of addressable memory, an integrated platform controller hub, integrated high-speed I/O and multiple 10 Gigabit Ethernet ports that can provide server-class operating capacity.

Embodiments of data management for edge architectures can be used with any type of edge resource such as edge gateway device 106, including edge resources that serve as access points at the far edge of a network, such as a small cell of a mobile wireless network or a wireless access point, and edge resources that serve as points of aggregation, such as a base station or cell tower. Embodiments of data management for edge architectures can also be used in network environments other than mobile communication networks, including in enterprise and fixed area networks. For example, an edge gateway device 106 could function as an access point or point of aggregation in a multi-access edge computing (MEC) and virtualized Radio Access Networks (vRAN) environment of an enterprise data center or as an access point or point of aggregation for an internet service hub of a cloud data center.

Embodiments of data management for edge architectures can also leverage the capabilities of distributed data storage using a disaggregated architecture. Disaggregated architecture refers to disaggregated resources (e.g., memory devices, data storage devices, accelerator devices, general purpose processors) that are selectively allocated, deallocated and logically coupled to form a composed node. The composed node can function as an edge resource, for example, a storage server located at the edge of a network data center. Various data center hardware resources, such as compute modules, non-volatile memory modules, hard disk (HDD) storage modules, FPGA modules, and networking modules, can be installed individually within a rack. These can be packaged as blades, sleds, chassis, drawers or larger physical configurations. Disaggregated architecture improves the operation and resource usage of a data center relative to data centers that use conventional storage servers containing compute, memory and storage in a single chassis. In one embodiment, data management for edge architectures can be provided completely within a disaggregated architecture, such as the Intel® Rack Scale Design (RSD) architecture provided by Intel Corporation.

In one embodiment an edge resource such as edge gateway device 106 includes a data management interface 108 and service configuration 114 logic to receive and store criteria for managing the data generated by the device 102. In one embodiment, the device 102 (and/or another edge resource 130) specifies the criteria for managing the data in write/store commands 104 and replication/move commands 122 received in the edge gateway device 106. The criteria for managing the data is stored in the hints and events table structure 116 per tenant ID and memory/storage range assigned to the device 102. The tenant ID can be a universal unique identifier (UUID) that uniquely distinguishes the tenant from other tenants whose data might be stored in the same edge resource, such as edge gateway device 106.

In one embodiment, a data management interface 108 and a data migration logic 110 include logic to manage the data stored in the storage 124 and memory 126 components based on the criteria stored in the table structure 116. The criteria are used to manage the data during the time that it is stored in the edge resource, such as edge gateway device 106.

In one embodiment, as the edge gateway device 106 receives the write and store commands 104, the chunks of data relayed in the commands are stored at a memory/storage address range assigned to the device 102. The hints and events are mapped to the corresponding memory/storage range in the table structure 116. A service configuration 114 logic responsible for maintaining the table structure 116 prepares the compute resources 128 to monitor the chunks of data stored at the corresponding memory/storage ranges. The compute resources 128 perform the data migration logic 110 and accelerator logic 112 to monitor and remove the chunks of data that no longer satisfy the criteria stored in the table structure 116.

In one embodiment, the compute resources 128 receive and generate move/replication commands 122 in accordance with the replication schemes 120 and the data management interface 108 in the edge gateway device 106. Before transmitting the move/replication commands and data to other edge resources, the compute resources 128 perform the data migration logic and accelerator logic 112 to determine whether the chunks of data being moved and/or replicated are subject to removal. If the chunks of data are not yet subject to removal, i.e., because the chunks of data still satisfy the specified criteria, the compute resources 128 perform the data migration and accelerator logic 112 to populate the move/replication commands 122 with the criteria as currently specified for the data in table structure 116. The compute resources 128 then relay the move/replicate commands, via data management interface 108, to the next edge resource 130.

In one embodiment, the criteria stored in the table structure 116 includes temporal hints, physical hints and event-based hints. In one embodiment, the criteria stored in the table structure 116 further includes a compound quality of service (QoS) and service level agreement (SLA) event that modifies the temporal hint based on the availability of memory. For example, if a large amount of memory is available then a longer amount of time can be specified in the temporal hint, e.g., 60 seconds. Conversely, if only a small amount of memory is available then a smaller amount of time can be specified in the temporal hint, e.g., 30 seconds. The smaller amount of time will insure that data stored in the corresponding memory/storage ranges is removed more quickly to free up available memory as soon as possible.

Figure 2A:
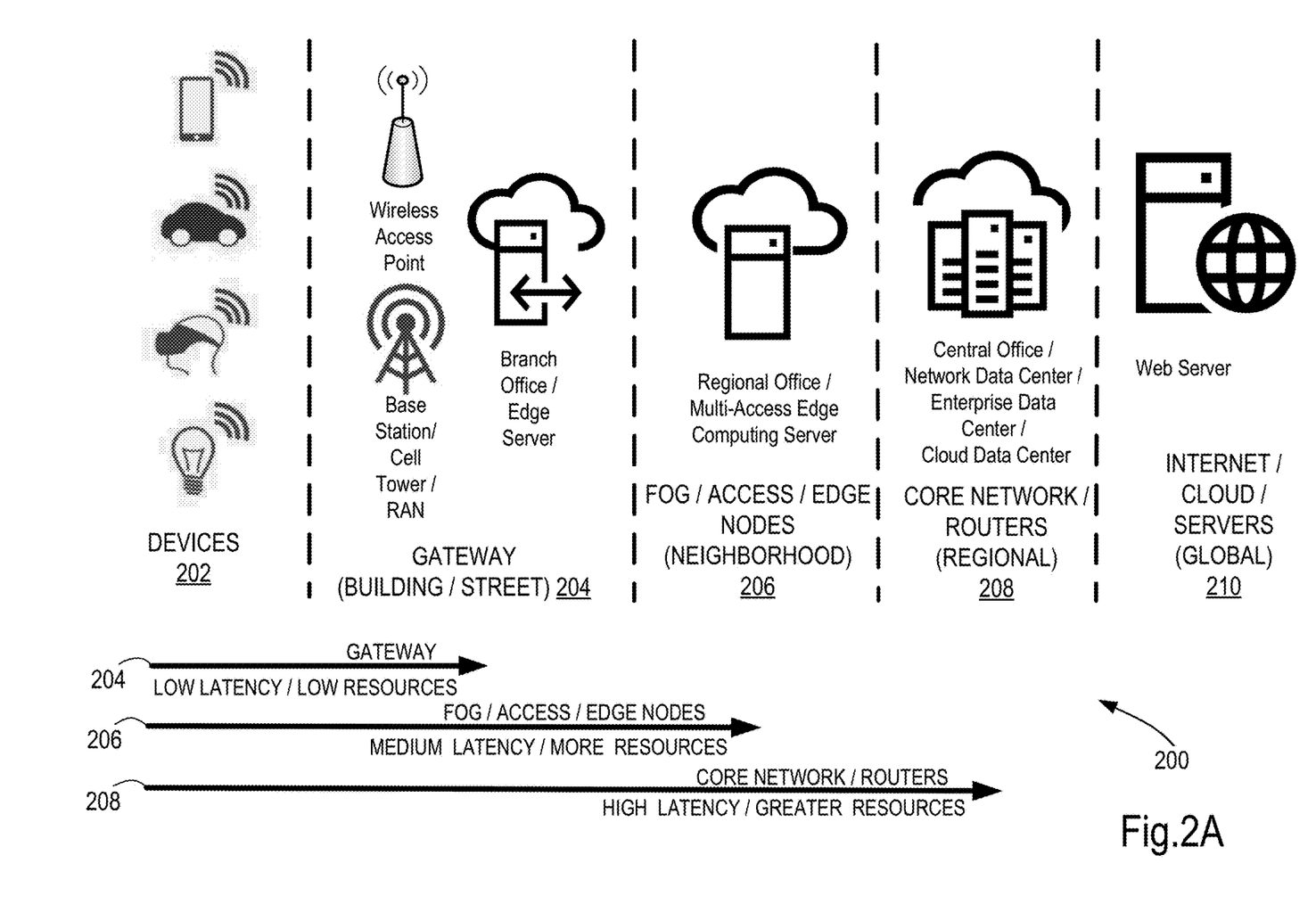
FIGS. 2A-2B are schematic block diagrams of edge resources in an edge architected computing system in which data management for edge architectures can be implemented in accordance with various examples described herein.
Figure 2B:
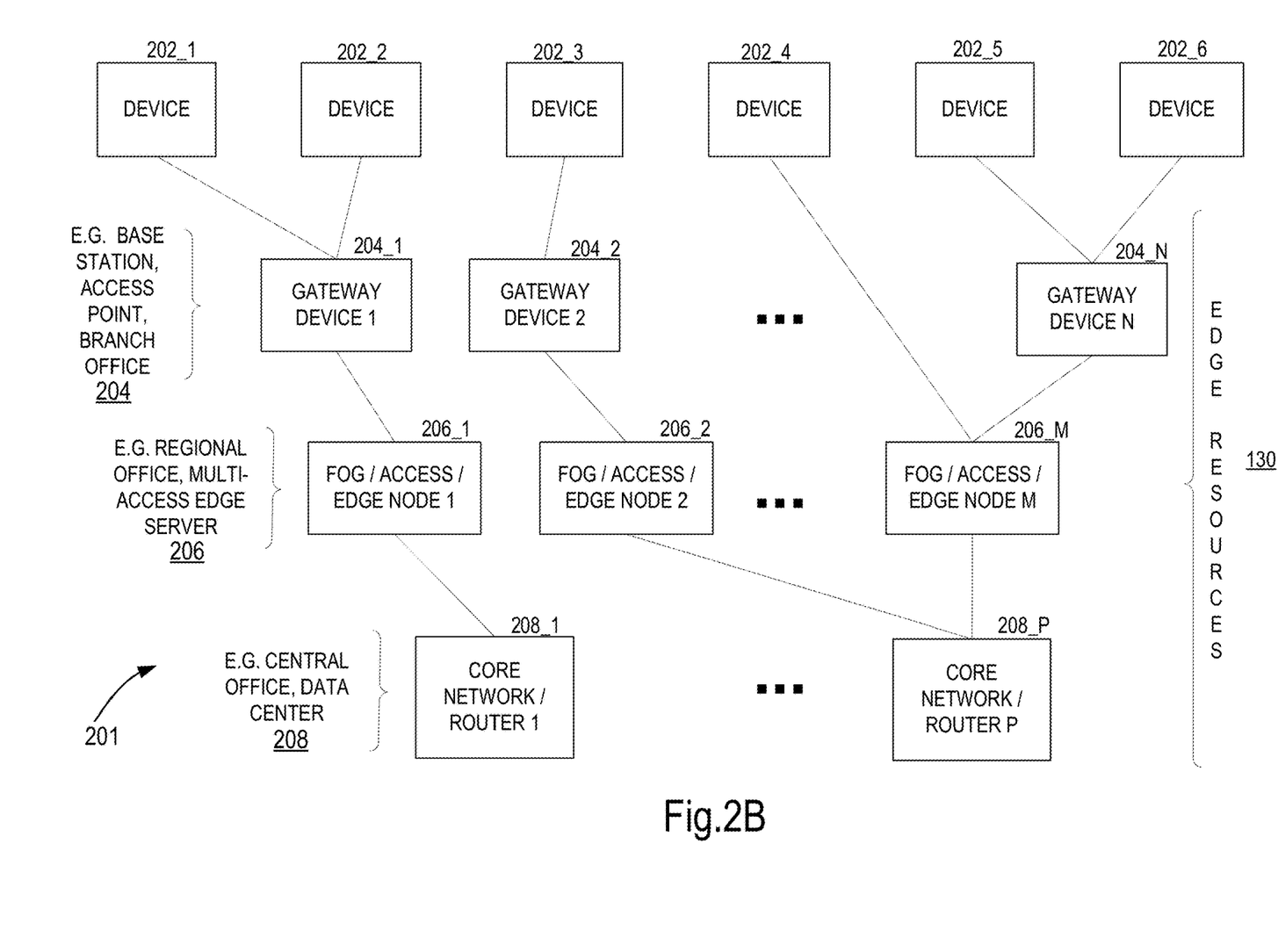

FIGS. 2A-2B illustrate an example edge architecture computing environment 200 in which data management for edge architectures can be deployed in accordance with the examples described herein. As depicted, the edge architecture computing environment 200 serves numerous types of devices 202 including but not limited to smart phones, autonomous vehicles, augmented reality devices and a wide variety of other IoT devices that generate data for edge computing. The edge resources of the edge architecture computing environment 200 include edge gateways 204 housed, for example, at the building and street level, include wireless access points, base station/cell towers, radio access networks (RAN), branch offices and edge servers, all of which can function as access points for the devices 202. Edge nodes 206, also referred to as fog or access nodes, are edge resources positioned at the neighborhood level, and include regional offices that serve as points of aggregation for edge gateways 204, and/or multi-access (wired and wireless) edge computing servers for providing real-time, high-bandwidth, low-latency access to radio network information. The core network/routers 208 are edge resources positioned at the regional level and include a central office that serves as a point of aggregation for the neighborhood level edge resources, a network data center, and enterprise data center and a cloud data center, all of which can be integrated with the lower level edge resources to provide access to global resources 210, such as web and cloud servers accessed via the internet.

As illustrated, the edge resource capacities vary in terms of latency in providing services and accessing data, and in terms of memory and storage resources for data. For example, the gateways 204 provide low latency because of their proximity to the edge devices 202, but they have fewer resources for memory and storage. The neighborhood level edge nodes 206 still provide relatively low latency as compared to more remote servers situated in regional data centers 208 and beyond 210, but not as low as the latency of the gateways 204. However, the neighborhood level edge nodes 206 typically have more capacity in terms of memory and storage resources than gateways 204. Lastly, the regional level core network/routers 208 have even greater capacity in terms of memory and storage resources. But due to their distance from the devices 202, the regional level core network/routers 208 experience high latency in providing services at the edge of an edge architected system.

FIG. 2B illustrates an example arrangement of edge resources in an edge architected computing system 201 in which embodiments of data management for edge architectures can be implemented. Devices 202_1, 202_2, 202_3, 202_4, 202_5 and 202_6 are representative of any number of devices 202 that can benefit from an edge architected computing system 201. For example, the number of devices 202 in an edge architected computing system 201 can be in the thousands, millions, or even billions of devices.

A device 202_1 through 202_6 can be any device capable of computing data and communicating with other system components either wirelessly or via a wired connection. Examples of devices 202_1 through 202_6 are depicted in FIG. 2A. For example, in an embodiment a device can be a cellular mobile telephone such as a smartphone. In another embodiment, a device can be an IoT-enabled device including a sensor and computing capability in an IoT network. Many other devices are contemplated, and embodiments of the present invention are not limited in this respect.

In one embodiment, numerous devices 202_1 through 202_6 are connected to a network of edge resources, referred to as the edge architected computing system 201. For example, a communication service provider can build an edge architected computing system 201 comprising small cell, base station and central office systems to provide low latency high bandwidth connections to devices 202_1 through 202_6 at the edge of a communication network, close to where the edge devices are located. As another example, a communication service provider can build an edge architected computing system 201 to deliver customized enterprise networking services, like Virtual Private Networks (VPN), firewalls, routing through Software Defined Wide Area Networks (SD-WAN), and workload optimizations through Network Function Virtualization (NFVi) using a network of tiered systems located in regional and branch offices. In another example, a cloud service provider can build an edge architected computing system 201 to deliver low latency high bandwidth cloud services using a network provider or internet service hub.

As shown, edge architected computing system 201 typically includes three levels (not counting the devices 202 as "leaf" nodes in the tree structure of FIG. 2B), although in other embodiments, other numbers of levels can be used. In embodiments, there can be any number of edge resources at each level. That is, there can be, for example, any number "N" of gateway devices 204_1, 204_2, . . . 204_N, any number "M" of fog/access/edge nodes 206_1, 206_2, . . . 206_M, and any number "P" of core network/routers, 208_1, . . . 208_P, where N, M, and P are natural numbers. In an embodiment, the number of devices 202 can be greater than the number N of gateway devices 204, the number N of gateway devices can be greater than the number M of fog/access/edge nodes 206, and the number M of fog/access/edge nodes can be greater than the number P of core network/routers 208.

In one embodiment, each edge resource may communicate with another edge resource either wirelessly or via a wired connection. The computing system architecture of embodiments of the present invention is scalable and extensible to any size and geographic area. In one embodiment, the computing system architecture may encompass a geographic area as large as the Earth and include as many edge resources 130 and levels 204, 206 and 208 as are needed to meet system requirements for service to devices 202. In an embodiment, a device 202_4 may communicate with a single gateway device 204 or fog/access/edge node 206 and multiple other edge resources, and a fog/access/edge node 206 may communicate with a single core network/router 208 and multiple other fog/access/edge nodes, and a core network/router 208 may communicate with other core network/routers. For example, gateway device 1 204_1 can communicate with fog/access/edge node 1 206_1, which may in turn communicate with core network/router 1 208_1, and so on as shown in the example hierarchical structure of FIG. 2B.

An edge gateway device such as gateway device 1 204_1 can communicate "downstream" with any number devices 202, such as devices 202_1 through 202_6, and "upstream" with a fog/access/edge node such as edge node 1 206_1. As another example, devices 202_1 through 202_2 may communicate with gateway device 2 204_1, and client 202_5 and 202_6 may communicate with gateway device N 204_N. In an embodiment, the number of devices 202 that an edge gateway device 204 communicates with may be limited by the computational and communication capacity of the gateway device. In an embodiment, devices may also communicate directly with a regional level device, such as is shown for devices 202_4 and fog/access/edge node M 206_M. Thus, a regional level edge resource may communicate "downstream" with devices 202 and/or gateway devices 204, and also "upstream" with a core network/router 208.

In edge architected computing system 201, devices 202 can be stationary or mobile. When devices 202 are mobile (such as smartphones, for example), devices may communicate at times with different edge gateway devices 204 as the devices move around in different geographic areas. Each device 202 communicates with only one level of edge resources at a time. When devices are stationary, they may communicate with a specific edge gateway device 204 or for/access/edge node 206 regional level device allocated to the geographic area where the device 202 is located.

In one embodiment, an edge gateway device (such as gateway device 1 204_1) includes a small cell. Small cells are low-powered cellular radio access nodes (RANs) that operate in licensed and unlicensed spectrum that have a range of 10 meters within urban and in-building locations to a few kilometers in rural locations. They are "small" compared to a mobile macro-cell, partly because they have a shorter range and partly because they typically handle fewer concurrent calls or sessions. They make best use of available spectrum by re-using the same frequencies many times within a geographical area. Fewer new macro-cell sites are being built, with larger numbers of small cells recognized as an important method of increasing cellular network capacity, quality and resilience with a growing focus using LTE (Long Term Evolution) Advanced and 5G mobile communication standards. Small-cell networks can also be realized by means of distributed radio technology using centralized baseband units and remote radio heads. These approaches to small cells all feature central management by mobile network operators.

Other types of edge resources 130 can comprise the edge architected computing system 201. For example, in one embodiment, a building/street level or neighborhood level edge resource (such as edge gateway 1 204_1 and fog/access edge node M 206_M) includes an access point to a radio access network (RAN) of a multi-access edge computing (MEC) network of a larger core network/router 208 of a network data center at the regional level, or an access point to an Internet service hub of a core network/router 208 of a cloud data center.

In one embodiment, a building/street level and neighborhood level edge resource (such as gateway device 1 204_1 or fog/access/edge node 1 206_1) includes a base station controlling multiple small cells and interaction with the upper tiers of a mobile wireless communication network, such as a central office or network data center at the regional level, e.g., a core network/router 1 208_1. Alternatively, or in addition, a fog/access/edge node 206 can also interact with an enterprise data center, or an internet service hub of a cloud data center at the regional level, e.g., core network router P 208_P.

Figure 3:
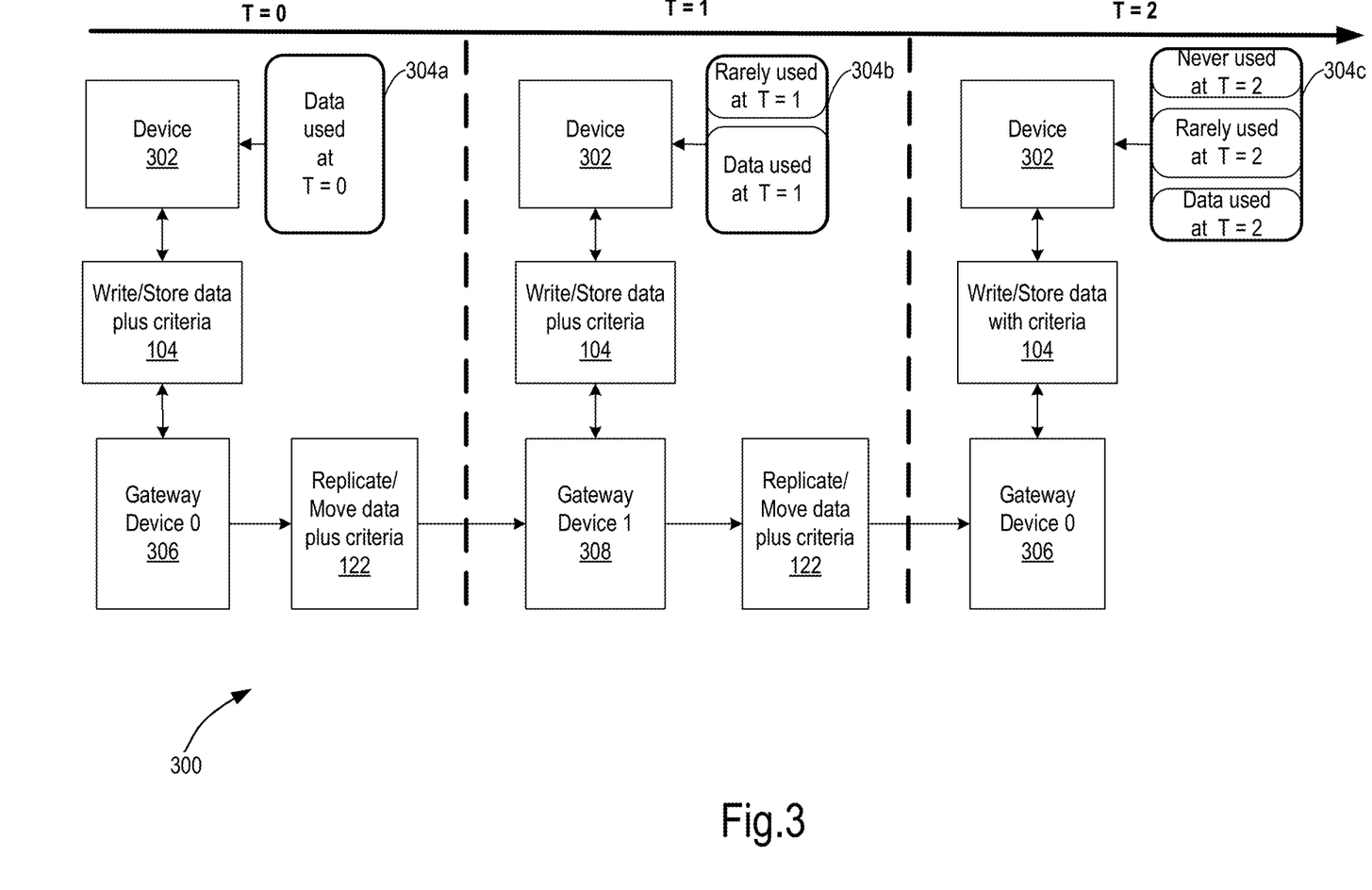
FIG. 3 is a schematic block diagram of a device interacting with an edge resource in which data management for edge architectures can be implemented in accordance with various examples described herein.

FIG. 3 illustrates a portion of an edge architected computing system 201 as in FIG. 2B, featuring a device 302 at three points in time, T=0, T=1 and T=2. At T=0, the device 302 uses a large amount of data 304a and transmits write/store commands 104 with event hints to an edge resource, in this example gateway device 0 306. In turn, gateway device 0 306 generates replicate/move commands 122 in accordance with a replication scheme to replicate or move data to a neighboring gateway, gateway device 1 308. Along with the data, the replicate/move commands 122 include any event hints or other types of criteria that were specified for the data when it was stored/written.

At T=1, the device 302 continues to issue write/store commands 104, this time to gateway device 1 308 (as device 302 has moved within range of gateway device 1). At this point in time, however, some of the data that was being used at T=0, is now rarely used at T=1, leaving only a portion of data actively being used at T=1. This will affect the criteria specified by device 302 since some of the data is now a candidate for removal from gateway device 1 308.

At T=2, the device 302 continues to issue write/store commands 104, this time back to edge gateway device 0 306 (as device 302 has returned to within range of gateway device 0). At this point in time, even more of the data that was being used at T=0 is now rarely used at T=2 or even never used, leaving a still smaller portion of data actively being used at T=2. This will again affect the criteria specified by device 302 since more of the data is now a candidate for removal from gateway device 0.

Figure 4A:
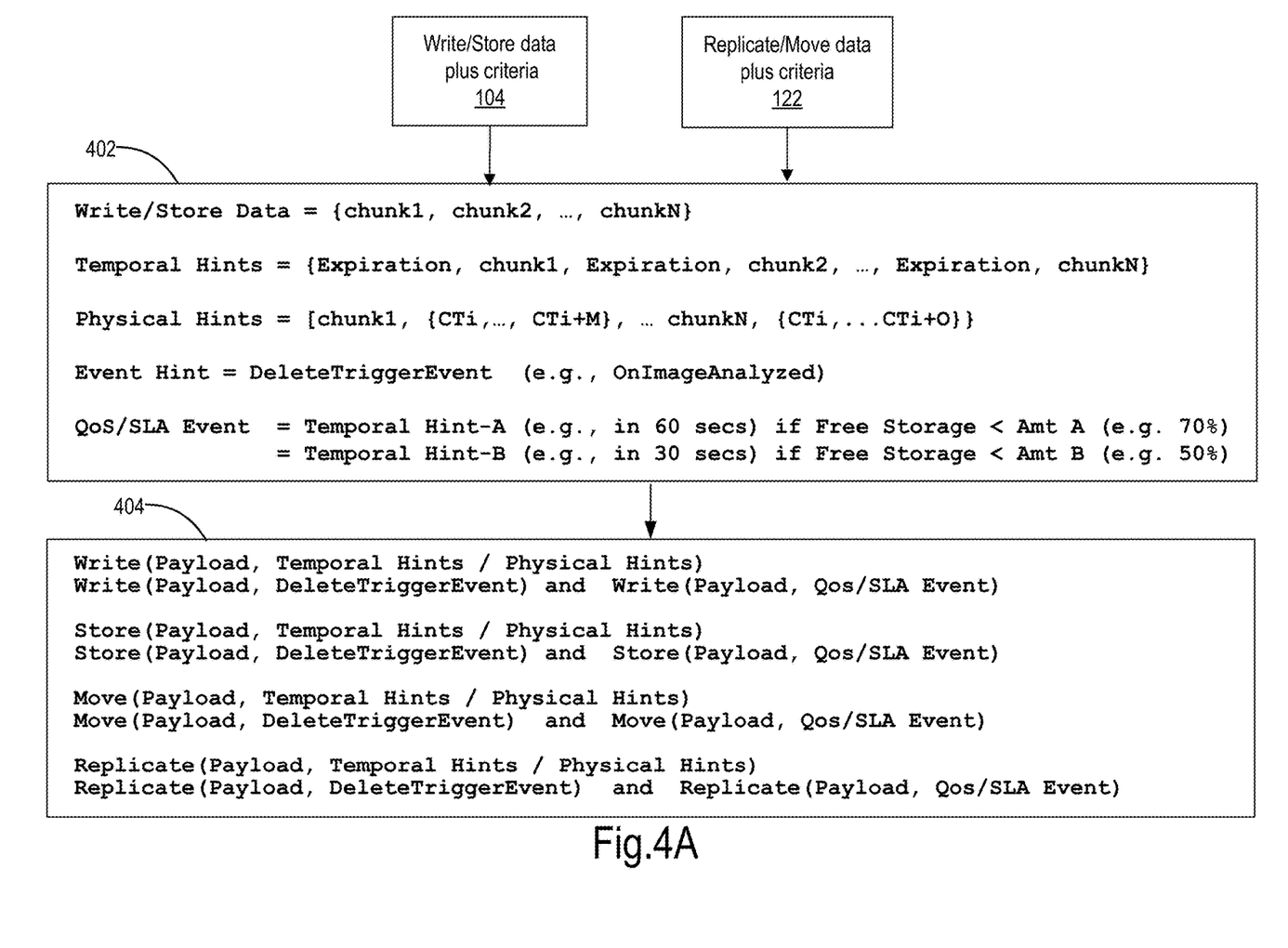
FIGS. 4A-4B illustrate example hints and events data for a system for data management for edge architectures in accordance with various examples described herein.

FIG. 4A illustrates an example of the criteria that are included in the write/store 104 and replication/move 122 commands received in the edge resources 130/106 from the devices 102 and/or received in the edge resources 130/106 from other edge resources 130 during moves or replication of data (referencing FIG. 1). Three types of criteria can be specified, temporal, physical and event-based criteria. Temporal criteria allow the data management interface 108 to specify to the edge resources 130/106 (or the corresponding tenants) for how long a given data can remain stored in an edge resource 106. For example, data coming from devices 102 that are mall surveillance sensors are typically valid only for 30 minutes after being stored in the local object store or local memory. Physical criteria allow the data management interface to specify to the edge resources (or the corresponding tenants) at what physical locations the data should no longer be stored. For example, data collected from a drone may only have relevance to a subset of gateway devices 106, e.g. base stations or other edge resource levels, e.g., a central office at the regional level. This type of criteria is typically applicable only when replication schemes 120 are used to propagate data from one edge resource to another. Event-based criteria allows the data management interface 108 to specify to the edge resources 130/106 (or the corresponding tenants) that a given data can be automatically destroyed just after certain events happen. For example, an accelerator 112 can process health care sensitive data by a particular Accelerator ID and, after the processing is complete, a compute resource 128 generates an event for use by the new data management interface 108 and data migration logic 110 to remove the data from memory/storage 124/126.

With reference again to FIG. 4A, in one embodiment, text box 402 includes example data and criteria layouts illustrating that data can be written/stored/replicated/moved in chunks. The temporal hints are associated with each chunk of data, chunk1, chunk2, . . . , chunkN, and include an expiration such as an absolute time expiration or time certain (e.g., timestamp 07:00:30) after which data can be removed, and/or a duration of time (30 seconds) after which data can be removed. A physical hint is also associated with a specific chunk of data and includes a list of the edge resources in which the data can be stored (e.g. gateway devices 106 that are within range of the device 102 from which the data originated or is being used). In this example, the edge resources are a list of valid access points for the data, such as the base stations or cell towers, CTi, . . . , CTi+M, for chunk1, and so forth.

In one embodiment, the event criteria include a DeleteTriggerEvent that specifies the name of a known trigger event that, when it occurs, indicates that the data is no longer needed and can be removed, such as the event On ImageAnalyzed. An OnImageAnalyzed event could be used, for example, in an image analysis application such as might be used in autonomous driving. Once the image is analyzed, the underlying image data, usually quite voluminous, can be removed from memory of the edge resource in which it was stored. Other types of application-specific trigger events can be used as well.

In one embodiment, a QoS/SLA event can be specified to modify the temporal hint(s) based on, for example, how much free storage is available in an edge resource. The amount can be specified as a percentage as shown in the illustrated example (e.g. 70% vs. 50%) or can be specified in absolute terms. Other types of conditional modifications of the temporal and physical hints can be included as part of the QoS/SLA in effect for a given tenant ID. In one embodiment, the criteria are specified in the write, store, move and replicate commands as illustrated in text box 404.

Figure 4B:
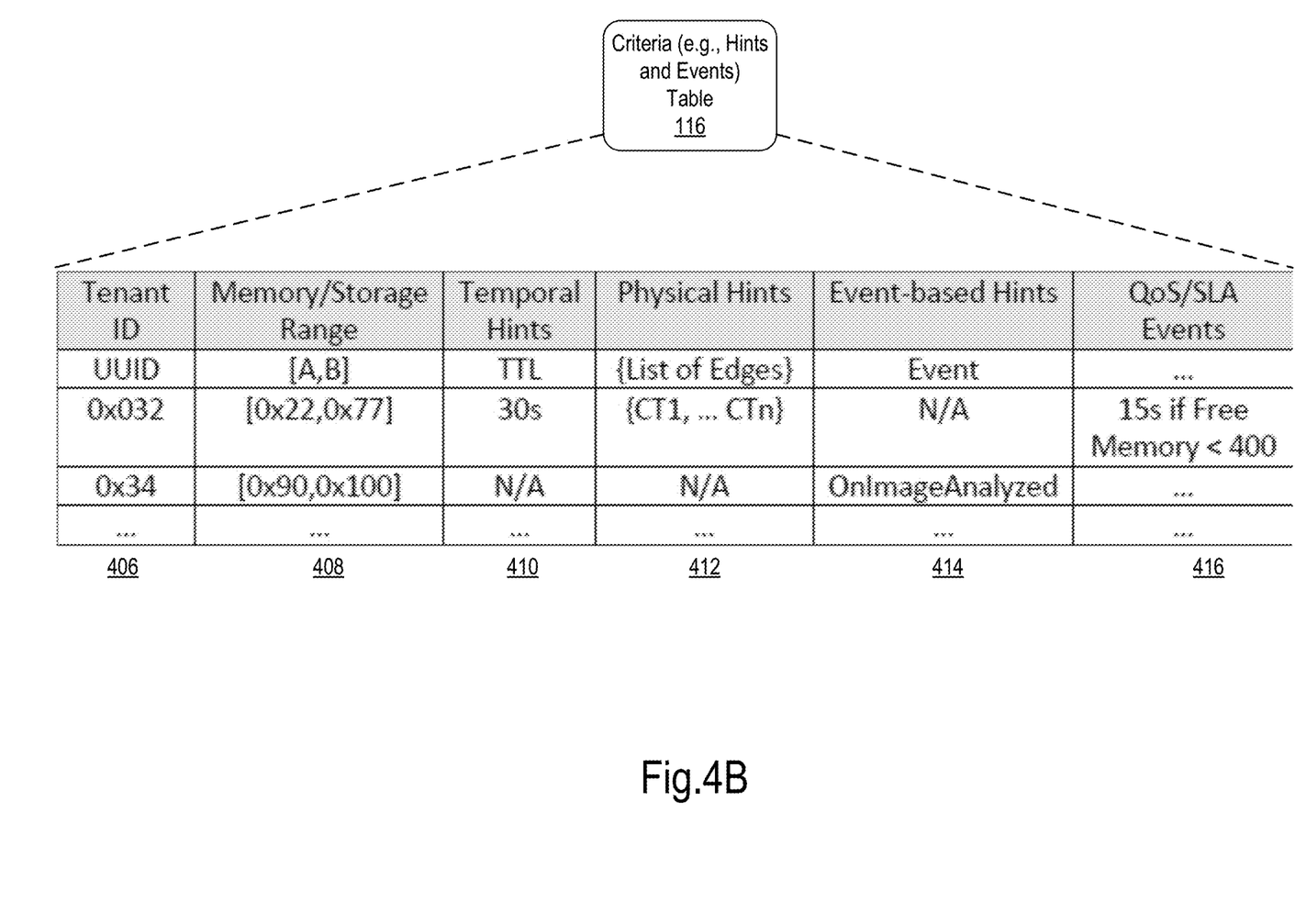

FIG. 4B illustrates an example layout of a hints and events, or criteria, table structure 116 first introduced in FIG. 1. As shown, the table maps the criteria to a Tenant ID 406 and Memory/Storage range 408. The Tenant ID 406 is specified with the UUID (universal unique ID) established for the tenant in the edge architected computing system, e.g., 201 of FIG. 2B, and the memory/storage range is specified as a pair of variables, with the beginning address followed by the ending address of the range assigned to the device 102 (and Tenant ID) with which the data is associated.

In one embodiment, the criteria include the temporal hints 410, specified as a time-to-live (TTL) value, typically in seconds. In one embodiment the TTL can also be expressed in a time stamp indicating a time certain or time expiration after which the data can be removed. In one embodiment the temporal hints 410 can be updated with new temporal hints, such as might be the case if the life of the data is extended through the software stack. In one embodiment, the physical hints 412 are specified as a list of edges, or edge resources, where the mapped data can be stored, such as a list of gateway devices, e.g., base stations or access points of the edge architected computing system 201. In one embodiment, the event-based hints 414 specify the name of an application-specific event that triggers deletion of the associated data. Lastly, a QoS/SLA event 416 specified the conditions for modifying the temporal hints 410, including a temporal hint in combination with a condition, such as the amount of free memory as described earlier. In some embodiments, other types of conditions can be used.

Figure 5:
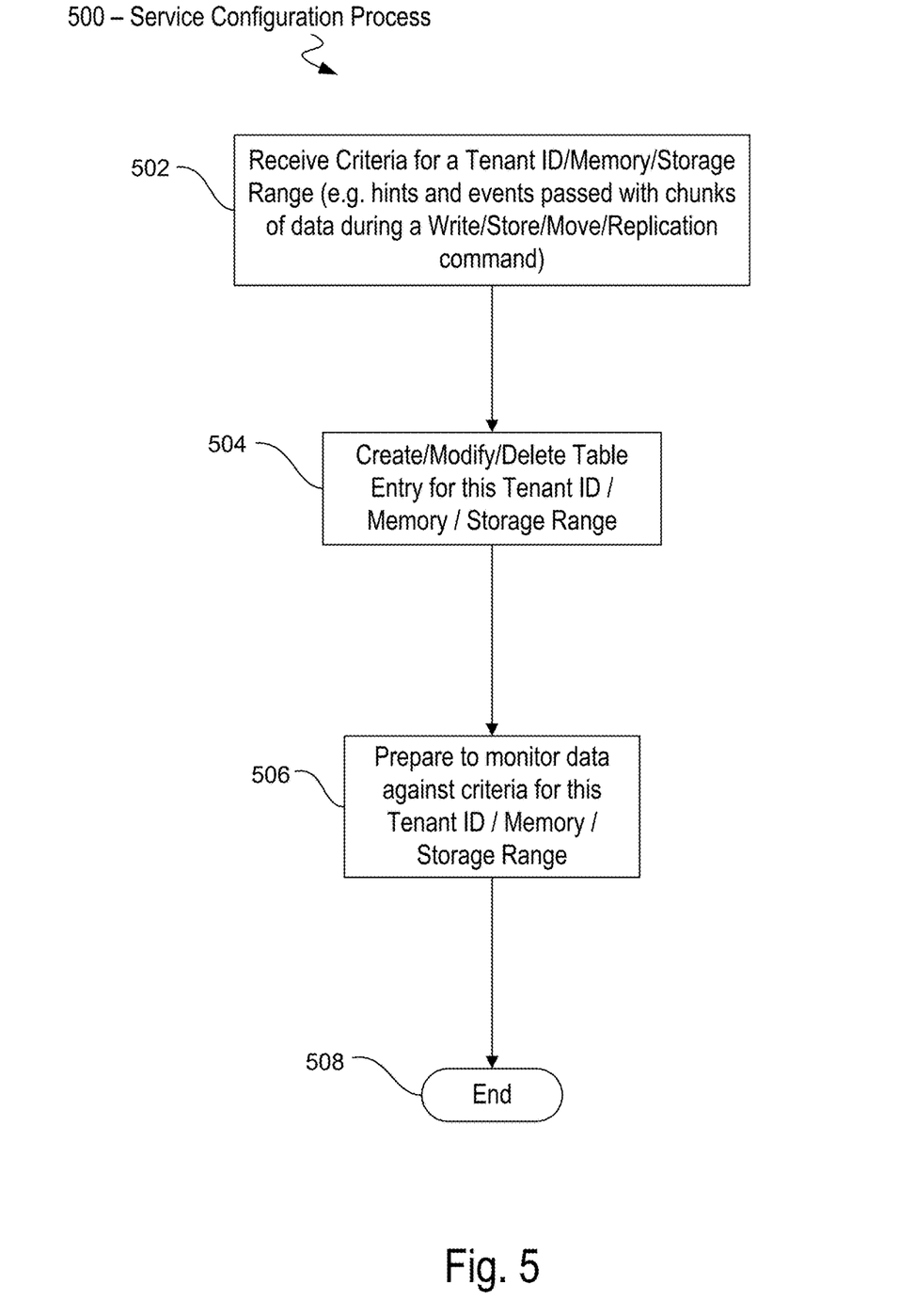
FIGS. 5-6 are flow diagrams of process flows for providing a system for data management for edge architectures in accordance with various examples described herein.
Figure 6:
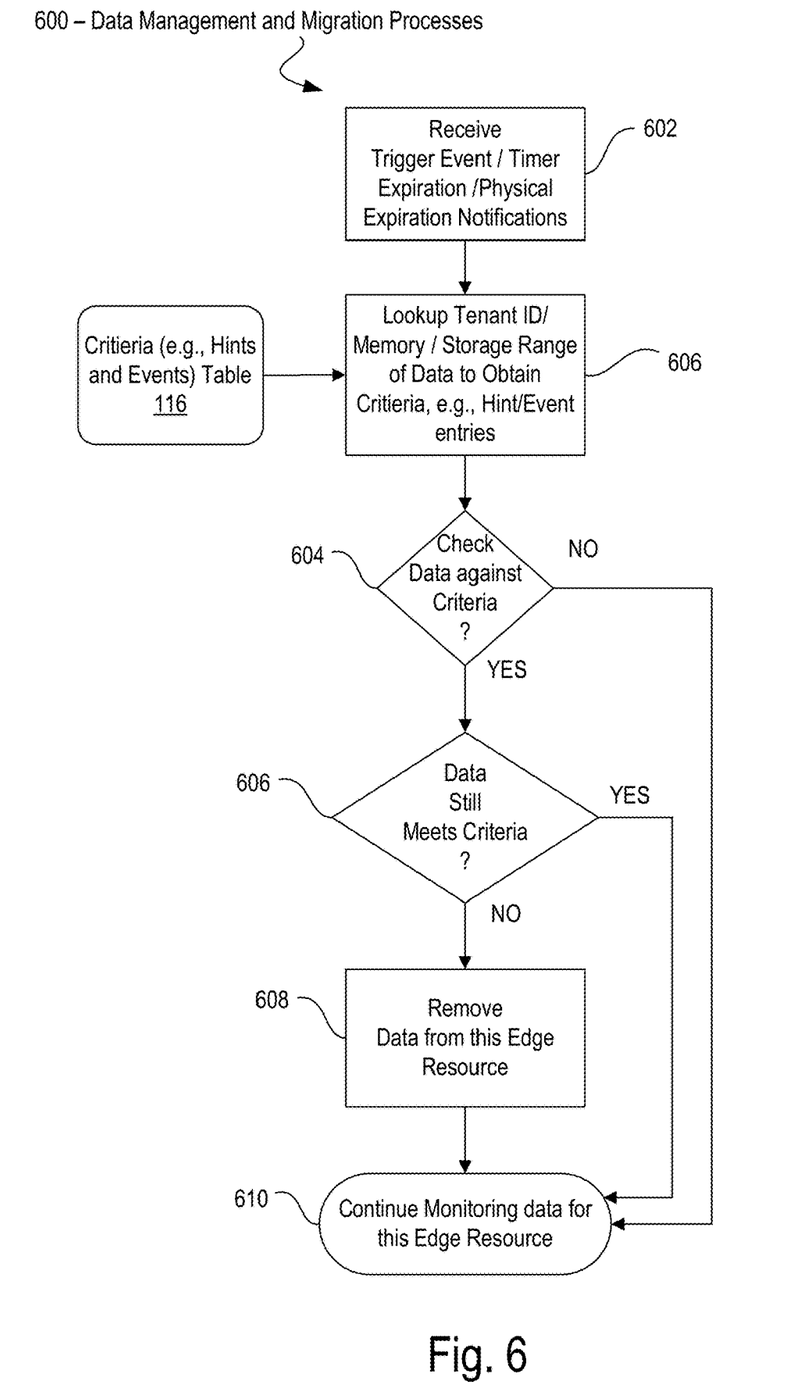

FIGS. 5 and 6 illustrates example logic flows of a service configuration process 500 as introduced in the service configuration logic 114 in FIG. 1 and data management and migration processes 600 as introduced in the data management interface 108, data migration logic 110 and accelerator 112 in FIG. 1. The set of logic flows in FIGS. 5 and 6 are representative of example methodologies for performing novel aspects of the disclosed edge architected computing system. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow can be implemented in software, firmware, and/or hardware. In software and firmware embodiments, a logic flow can be implemented by computer executable instructions stored on at least one non-transitory computer readable medium or machine readable medium, such as an optical, magnetic or semiconductor storage. The embodiments are not limited in this context.

At block 502, a service configuration process 500 receives hints and events for a Tenant ID and memory/storage range. The hints and events are criteria that are passed along with chunks of data from the edge devices as part of a write/store 104 or move/replication 122 command. At block 504, the service configuration process 500 creates, modifies and deletes the table entries for this tenant ID and memory/ storage range. At block 506, the service configuration process 500 prepares to monitor the criteria for managing data for this tenant ID at the memory storage range location, and the service configuration process logic ends at block 508.

With reference to FIG. 6, at block 602, a data management interface receives any of an application-specific trigger event, or a timer expiration or physical expiration notification. The application-specific trigger event is typically generated by the device to enable an edge resource, e.g., a gateway device, to discard the data once the trigger event, also referenced as the delete trigger event, has occurred, such as the completion of an image analysis. The timer expiration is self-explanatory and is usually a timer on the order of 15 to 30 seconds. The physical expiration notification is typically generated through the RAN network notifications that the device with which the data in question is associated has moved out of range of the edge resource of the edge architected computing system.

In one embodiment, at block 606, the process 600 performs a lookup of the tenant ID and memory storage range of data to obtain the criteria, e.g., the hint and event entries from table structure 116. At decision bock 604, the process 600 determines whether the data needs to be managed based on the criteria in the hints and events entries from table structure 116 and the notifications received at block 602. If the data does not need to be managed at this time, the process 600 branches to the end of the routine at 610 to continue monitoring the data for this edge resource, e.g., gateway device. If the data does need to be managed, then the process 600 continues at decision block 606 to determine if the data still satisfies the criteria obtained from the table structure 116.

In one embodiment, if the data satisfies the criteria obtained from table structure 116, then the process 600 simply continues to monitor the data for this edge resource, e.g., gateway device, at 610. Otherwise, for data that does not satisfy the criteria obtained from table structure 116, the process at block 608, proceeds to remove the data from this edge resource. In this manner the data management and migration processes can efficiently reduce the amount of data that is stored at an edge resource, e.g. a gateway device.

Figure 7:
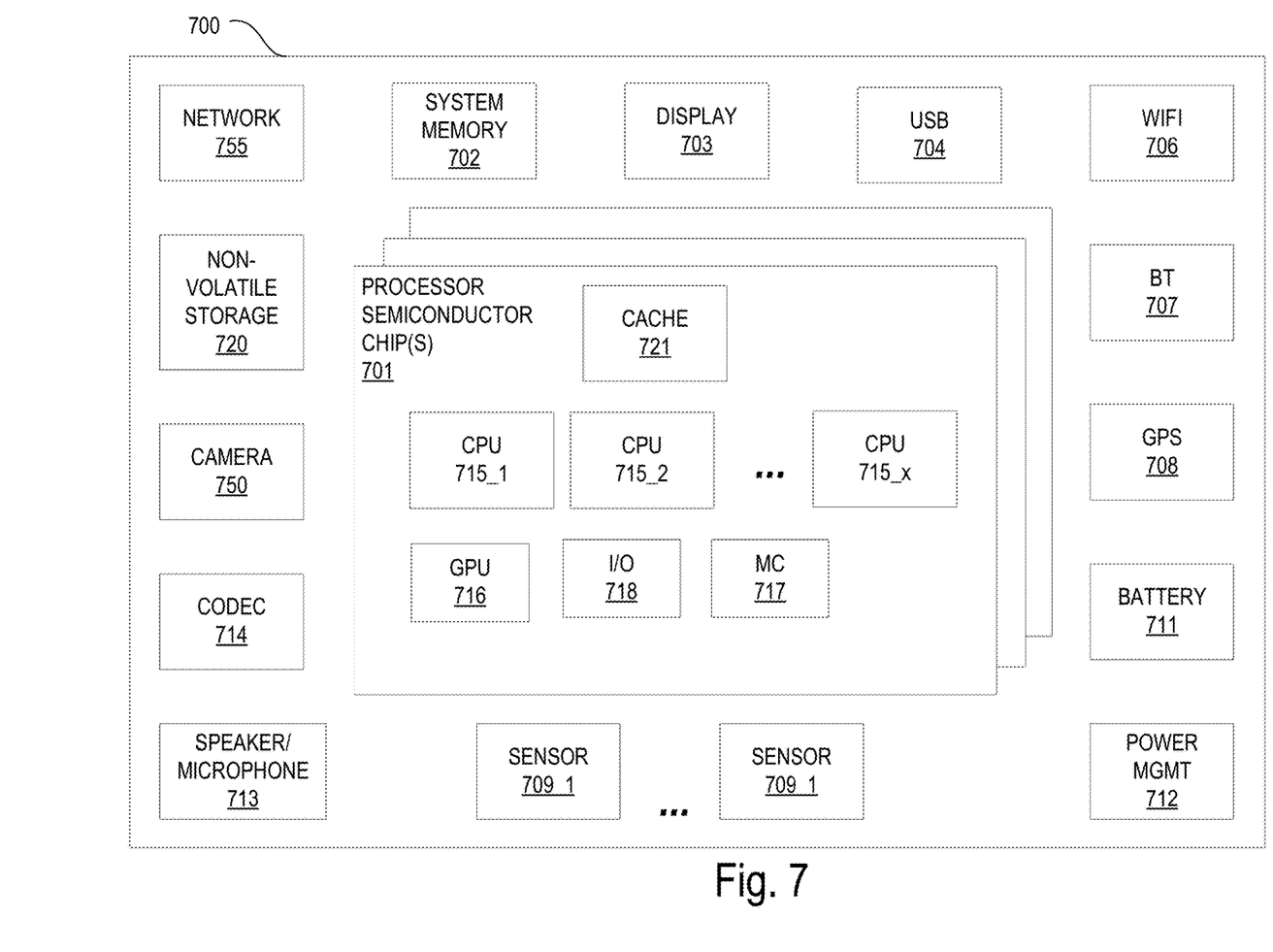
FIG. 7 is a schematic block diagram of a computing system in which data management for edge architectures can be implemented in accordance with various examples described herein.

FIG. 7 illustrates an example computing system 700 in which embodiments of data management for edge architectures can be implemented. According to some examples, computing system 700 may include, but is not limited to, an edge resource, including an edge device, and edge gateway device, and an edge node, a small cell, a base station, a central office switching equipment, a server, a server array or server farm, a web server, a network server, an Internet server, a work station, a mini-computer, a main frame computer, a supercomputer, a network appliance, a web appliance, a distributed computing system, a personal computer, a tablet computer, a smart phone, multiprocessor systems, processor-based systems, or combination thereof.

As observed in FIG. 7, the computing system 700 may include at least one processor semiconductor chip 701. Computing system 700 may further include at least one system memory 702, a display 703 (e.g., touchscreen, flat-panel), a local wired point-to-point link (e.g., USB) interface 704, various network I/O functions 755 (such as an Ethernet interface and/or cellular modem subsystem), a wireless local area network (e.g., WiFi) interface 706, a wireless point-to-point link (e.g., Bluetooth (BT)) interface 707 and a Global Positioning System (GPS) interface 708, various sensors 709_1 through 709_Y, one or more cameras 750, a battery 711, a power management control unit (PWR MGT) 712, a speaker and microphone (SPKR/MIC) 713 and an audio coder/decoder (codec) 714. The power management control unit 712 generally controls the power consumption of the system 700.

An applications processor or multi-core processor 701 may include one or more general purpose processing cores 715 within processor semiconductor chip 701, one or more graphical processing units (GPUs) 716, a memory management function 717 (e.g., a memory controller (MC)) and an I/O control function 718. The general-purpose processing cores 715 execute the operating system and application software of the computing system. The graphics processing unit 716 executes graphics intensive functions to, e.g., generate graphics information that is presented on the display 703. The memory control function 717 interfaces with the system memory 702 to write/read data to/from system memory 702.

Each of the touchscreen display 703, the communication interfaces 704, 755, 706, 707, the GPS interface 708, the sensors 709, the camera(s) 710, and the speaker/microphone codec 713, and codec 714 all can be viewed as various forms of I/O (input and/or output) relative to the overall computing system including, where appropriate, an integrated peripheral device as well (e.g., the one or more cameras 710).

Depending on implementation, various ones of these I/O components can be integrated on the applications processor/multi-core processor 701 or can be located off the die or outside the package of the applications processor/multi-core processor 701. The computing system also includes non-volatile storage 720 which can be the mass storage component of the system.

Computing system 700 may also include components for communicating wirelessly with other devices over a cellular telephone communications network is as known in the art. Various examples of computing system 700 when embodied as a small cell, base station, or central office may omit some components discussed above for FIG. 7.

Figure 8:
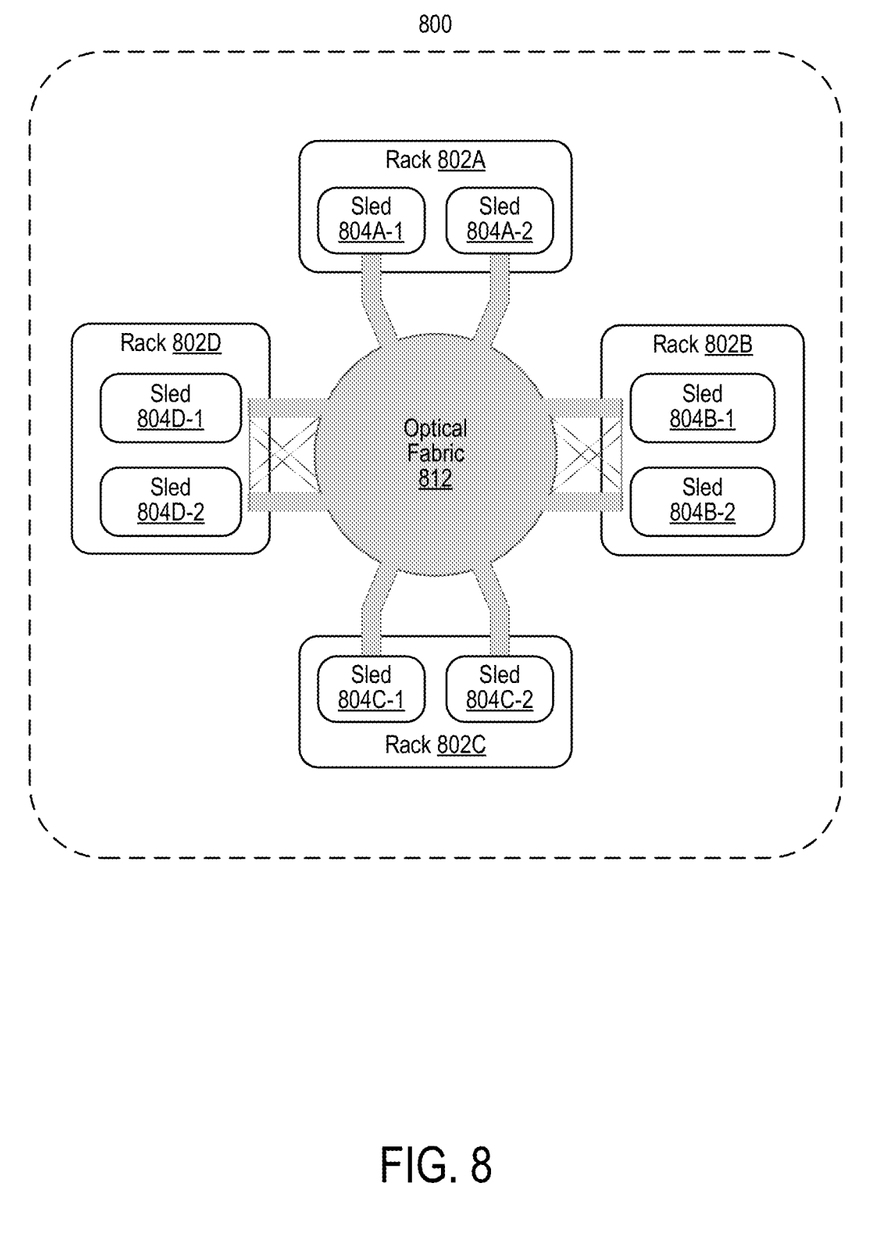
FIG. 8 depicts an example of a data center in which data management for edge architectures can be implemented in accordance with various examples described herein.

FIG. 8 depicts an example of a data center in accordance with which embodiments of data management for edge architectures can be used. As shown in FIG. 8, data center 800 may include an optical fabric 812. Optical fabric 812 may generally include a combination of optical signaling media (such as optical cabling) and optical switching infrastructure via which any sled in data center 800 can send signals to (and receive signals from) the other sleds in data center 800. The signaling connectivity that optical fabric 812 provides to any given sled may include connectivity both to other sleds in a same rack and sleds in other racks. Data center 800 includes four racks 802A to 802D and racks 802A to 802D house respective pairs of sleds 804A-1 and 804A-2, 804B-1 and 804B-2, 804C-1 and 804C-2, and 804D-1 and 804D-2. Thus, in this example, data center 800 includes a total of eight sleds. Optical fabric 8012 can provide sled signaling connectivity with one or more of the seven other sleds. For example, via optical fabric 8012, sled 804A-1 in rack 802A may possess signaling connectivity with sled 804A-2 in rack 802A, as well as the six other sleds 804B-1, 804B-2, 804C-1, 804C-2, 804D-1, and 804D-2 that are distributed among the other racks 802B, 802C, and 802D of data center 800. The embodiments are not limited to this example. For example, fabric 812 can provide optical and/or electrical signaling.

Various examples can be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples might be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples might be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

Additional example implementations are as follows:

An example method, system, apparatus or computer-readable medium to enable data management in edge architectures comprises a compute resource coupled to a data resource, the compute resource to execute a logic to receive a request over a network to store data in the data resource, the request to specify a criteria for managing the data, store the data at an address range of the data resource assigned to a device from which the data originated, map the criteria to the address range, and manage the data stored at the address range of the data resource assigned to the device, including removal of the data from the address range upon a determination that the data no longer satisfies the criteria.

In another example implementation, the criteria includes any of a temporal hint to specify a time, including any of an amount of time and a time certain, after which the data can be removed, a physical hint to specify a list of edge resources outside of which the data can be removed, and an event-based hint to specify an event after which the data can be removed.

In another example implementation, the criteria includes a quality of service condition to modify the temporal hint, the quality of service condition including at least one threshold amount of free data resources above which the time specified in the temporal hint increases and beneath which the time specified in the temporal hint decreases.

In another example implementation, the data resource includes any of a memory resource and a storage resource and the logic to store the data at the address range of the data resource includes any of a write operation and a store operation.

In another example implementation, an example system or apparatus can be positioned at any of a point of access and a point of aggregation in a network, including a cellular network, a wireless network and a wired network.

In another example implementation, the compute resource can execute logic to determine that the data at the address range of the data resource is to be any of moved and replicated to a second edge resource and, if the data satisfies the criteria, to transmit to the second edge resource the data at the address range along with the criteria mapped to the address range.

In another example implementation, the device from which the data originated can be any device capable of transmitting and receiving the data to one or more edge resources having control of one or more address ranges where the data is stored.

In another example implementation, an example system or apparatus can include a radio access network (RAN) telemetry component to wirelessly communicate with the device and another edge resource.

In another example implementation, an example system or apparatus can include a server comprising a network interface to a device, a data store to store a data at an address range assigned to the device, and circuitry coupled to the data store and the network interface, the circuitry to determine a criteria for managing the data, map the criteria to the address range at which the data is stored, and manage the data stored at the address range, including removal of the data from the address range upon a determination that the data no longer satisfies the criteria.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising:
a compute resource including a processor, the compute resource coupled to a data resource, the processor to execute a logic to:
receive a request over a network to store data in the data resource, the request to specify a criteria for managing the data;
store the data at an address range of the data resource assigned to a device from which the data originated;
map the criteria to the address range; and
manage the data stored at the address range of the data resource assigned to the device, including removal of the data from the address range upon a determination that the data no longer satisfies the criteria.

2. The computing system as in claim 1, wherein the criteria includes any of:
a temporal hint to specify a time, including any of an amount of time and a time certain, after which the data can be removed;
a physical hint to specify a list of edge resources outside of which the data can be removed; and
an event-based hint to specify an event after which the data can be removed.

3. The computing system as in claim 2, wherein the criteria further includes a quality of service condition to modify the temporal hint, the quality of service condition including at least one threshold amount of free data resources above which the time specified in the temporal hint increases and beneath which the time specified in the temporal hint decreases.

4. The computing system as in claim 1, wherein:
the data resource includes any of a memory resource and a storage resource; and
the logic to store the data at the address range of the data resource includes any of a write operation and a store operation.

5. The computing system of claim 1 positioned at any of a point of access and a point of aggregation in a network, including a cellular network, a wireless network and a wired network.

6. The computing system as in claim 1, wherein the processor to execute the logic to further:
determine that the data at the address range of the data resource is to be any of moved and replicated to a second edge resource; and
if the data satisfies the criteria, to transmit to the second edge resource the data at the address range along with the criteria mapped to the address range.

7. The computing system of claim 1, wherein the device comprises any device capable of transmitting and receiving the data to one or more edge resources having control of one or more address ranges where the data is stored.

8. The computing system of claim 1, further comprising a radio access network (RAN) telemetry component to wirelessly communicate with the device and another edge resource.

9. A method comprising:
receiving, in an edge resource at an edge of a network, a request to store a data in a memory of the edge resource, the request specifying criteria for managing the data;
storing the data in the edge resource at an address range of the memory assigned to a device from which the data originated;
mapping the criteria to the address range; and
managing the data stored at the address range of the memory, including removing the data from the address range upon determining that the data no longer satisfies the criteria.

10. The method as in claim 9, wherein the criteria includes any of:
a temporal hint to specify a time, including any of an amount of time and a time certain, after which the data can be removed from the edge resource;
a physical hint to specify a list of edge resources outside of which the data can be removed from the edge resource; and
an event-based hint to specify an event after which the data can be removed from the edge resource.

11. The method as in claim 10, wherein the criteria further includes a quality of service condition to modify the temporal hint, the quality of service condition including at least one threshold amount of free memory above which the time specified in the temporal hint increases and beneath which the time specified in the temporal hint decreases.

12. The method as in claim 9, further comprising:
determining that the data at the address range of the memory is to be any of moved and replicated to a second edge resource; and
if the data satisfies the criteria, to transmit to the second edge resource the data at the address range along with the criteria mapped to the address range.

13. The method as in claim 9, wherein the device comprises any device capable of transmitting the data to and receiving the data from the edge resource controlling the address range of the memory where the data is stored.

14. The method of claim 9, further comprising receiving a radio access network (RAN) telemetry data from the device.

15. A server comprising:
a network interface to a device;
a data store to store a data at an address range assigned to the device; and
circuitry coupled to the data store and the network interface, the circuitry to:
determine a criteria for managing the data;
map the criteria to the address range at which the data is stored; and
manage the data stored at the address range, including removal of the data from the address range upon a determination that the data no longer satisfies the criteria.

16. The server of claim 15, wherein the circuitry is further to:
determine that the data at the address range of the data store is to be any of moved and replicated to a second data store in a second device; and
if the data satisfies the criteria, to transmit to the second device the data at the address range along with the criteria mapped to the address range.

17. The server of claim 15, wherein:
the network interface to receive the criteria in a request from the device to store the data; and
the criteria including any of:
a temporal hint to specify a time, including any of an amount of time and a time certain, after which the data can be removed;
a physical hint to specify a list of devices for storing the data outside of which the data can be removed; and
an event-based hint to specify an event after which the data can be removed.

18. The server as in claim 17, wherein the criteria further includes a quality of service condition to modify the temporal hint, the quality of service condition including at least one threshold amount of available storage in the data store above which the time specified in the temporal hint increases and beneath which the time specified in the temporal hint decreases.

19. The server as in claim 15, wherein:
the data store includes a memory resource and a storage resource; and
to store the data at the address range of the data store includes any of a write operation and a store operation.

20. The server of claim 15 positioned at any of a point of access and a point of aggregation in a network, including a cellular network, a wireless network and a wired network, wherein the network interface to the device is configured to operate with the network.

21. The server of claim 15, wherein the network interface includes a radio access network (RAN) telemetry component to wirelessly communicate with the device and another device.

22. The server of claim 15, wherein the network interface is to transmit and receive the data to and from any one or more of:
the device; and
any other server having one or more data stores to store the data at one or more address ranges assigned to the device.

\* \* \* \* \*